(12) United States Patent
Nilsson et al.

(10) Patent No.: US 10,730,382 B2
(45) Date of Patent: Aug. 4, 2020

(54) GEARBOX

(71) Applicant: BorgWarner Sweden AB, Landskrona (SE)

(72) Inventors: Johan Nilsson, Prague (CZ); Mikael Tiainen, Lindome (SE); Hans Aulin, Malmö (SE)

(73) Assignee: BORGWARNER TORQTRANSFER SYSTEMS AB, Landskrona (SE)

( * ) Notice: Subject to any disclaimer, the term of this patent is extended or adjusted under 35 U.S.C. 154(b) by 226 days.

(21) Appl. No.: 15/738,446

(22) PCT Filed: Jun. 27, 2016

(86) PCT No.: PCT/EP2016/064871
§ 371 (c)(1),
(2) Date: Dec. 20, 2017

(87) PCT Pub. No.: WO2016/207440
PCT Pub. Date: Dec. 29, 2016

(65) Prior Publication Data
US 2018/0170168 A1    Jun. 21, 2018

(30) Foreign Application Priority Data

Jun. 25, 2015 (SE) ........................ 1550878

(51) Int. Cl.
*B60K 6/48* (2007.10)
*B60H 1/32* (2006.01)
(Continued)

(52) U.S. Cl.
CPC ............. *B60K 6/48* (2013.01); *B60H 1/3222* (2013.01); *B60K 6/365* (2013.01); *B60K 6/547* (2013.01); *F02B 67/04* (2013.01); *F16H 3/54* (2013.01); *F16H 63/06* (2013.01); *F16H 63/062* (2013.01); *F16H 63/18* (2013.01); *F16H 63/32* (2013.01); *B60K 2006/4841* (2013.01); *B60Y 2200/92* (2013.01); *F16H 2063/3089* (2013.01); *F16H 2063/321* (2013.01); *F16H 2063/322* (2013.01);
(Continued)

(58) Field of Classification Search
CPC .......... B60K 6/48; B60K 6/547; B60K 6/365; F16H 63/18; F16H 63/062; F16H 63/06; F16H 3/54; F16H 63/32; F02B 67/04; B60H 1/3222
See application file for complete search history.

(56) References Cited

U.S. PATENT DOCUMENTS 9,447,726 B2 * 9/2016 Hemphill ................ F02B 67/04
2006/0019786 A1    1/2006 Asa et al.
(Continued)

FOREIGN PATENT DOCUMENTS

DE        10335804 A1    3/2004
DE    102009038338 A1    2/2011
(Continued)

*Primary Examiner* — Patrick H MacKey
(74) *Attorney, Agent, or Firm* — Young Basile Hanlon & MacFarlane, P.C.

(57) ABSTRACT

A gearbox (1) is placed in a drive train between an electric motor (12) and an engine (13) of a vehicle. The gearbox (1) is placed in direct connection to an output shaft (2) of the electric motor (12). The gear box (1) has means to place it in three different modes.

9 Claims, 9 Drawing Sheets

(51) Int. Cl.
  *F02B 67/04* (2006.01)
  *F16H 63/32* (2006.01)
  *F16H 63/06* (2006.01)
  *F16H 63/18* (2006.01)
  *B60K 6/365* (2007.10)
  *B60K 6/547* (2007.10)
  *F16H 3/54* (2006.01)
  *F16H 63/30* (2006.01)

(52) U.S. Cl.
  CPC ............... *F16H 2200/2005* (2013.01); *F16H 2200/2097* (2013.01); *Y10S 903/91* (2013.01); *Y10S 903/919* (2013.01)

(56) References Cited

U.S. PATENT DOCUMENTS

| | | | | |
|---|---|---|---|---|
| 2012/0158233 A1* | 6/2012 | Makino | ............ | B60L 50/16 |
| | | | | 701/22 |
| 2017/0175824 A1* | 6/2017 | Timoney | ............ | B60K 23/04 |
| 2017/0274757 A1* | 9/2017 | Iwano | ............ | F16H 3/091 |

FOREIGN PATENT DOCUMENTS

| | | | | |
|---|---|---|---|---|
| DE | 102010017760 A1 | | 1/2012 | |
| DE | 102013222721 A1 | | 5/2015 | |
| JP | 2004066956 A | * | 3/2004 | ......... B60H 1/3222 |

\* cited by examiner

GEARBOX

This application claims the benefit of Swedish Application No. 1550878-1 filed Jun. 25, 2015, and PCT Application No. EP2016/064871 filed Jun. 27, 2016.

TECHNICAL FIELD

The present invention concerns a gearbox placed in the drive train between an electric motor and an internal combustion engine of a vehicle.

BACKGROUND

In vehicles an electric motor is used both as a starting motor and for driving of other parts of the vehicle, such as an AC (air condition), fans and water pumps. In some situations the electric motor is driven as a generator. This is used in hybridizing in that energy is stored during braking, which stored energy can be used during acceleration. A driveline comprising the electric motor and the engine (internal combustion engine) of the vehicle is normally formed. A gearbox of this driveline is normally placed adjacent to the engine.

In some instances it is beneficial to be able to run the AC even if the engine of the vehicle is turned of Such an instance is if one wants to cool down the interior of the vehicle before entering it.

SUMMARY

The gearbox of the present invention has three working modes; cranking, neutral, boosting, and regeneration/charging.

The cranking mode (high ratio) gives a high ratio in order to allow cold start.

The neutral mode could also be called cool welcome mode or disconnect mode. The neutral mode is used in-between gear change. It is also used for running the AC. Further it is used for disconnecting the electric motor from the internal combustion engine and to reduce drag losses.

The boosting mode (high or low ratio) allows up to 100% torque increase at idle speed for a typical diesel engine.

The regeneration/charging mode (high or low mode) allows regeneration of energy when braking. It also gives normal charging in case of low SOC (state of charge of battery).

By having the AC constantly connected to the electric motor, the AC can run irrespective of whether the internal combustion engine of the vehicle is running or not. It also makes it possible to have a timer for controlling the AC, for example in order to start cooling down of the interior of the vehicle some time before expected departure or when the car senses that the driver approaches the car through the keyless system.

The high ratio of the gearbox is used to give a high torque, which may be needed when starting in cold weather and if the starting time is critical. It is also possible to get a torque boost on the drive train at low rotational speed. The two active shifting modes of the gearbox can be used to force the electric motor into an operation point to give the best efficiency. The lower mode can be used all the way up to maximal rotational speed of the combustion engine. By boosting the torque in transients it is possible to reduce the formation of soot. Further the concept makes downsizing possible and optimizing of the gear ratio to have the lowest possible fuel consumption.

All the gearboxes described in connection with the present invention have two gear ratios including a neutral mode.

Placing the gearbox adjacent to the electric motor is often beneficial in view of available space in the vehicle.

Further objects and advantages of the present invention will be obvious to a person skilled in the art when reading the detailed description below of different embodiments.

BRIEF DESCRIPTION OF THE DRAWINGS

The invention will be described further below by way of example and with reference to the enclosed drawings. In the drawings.

DETAILED DESCRIPTION OF EMBODIMENTS

In the description below corresponding parts of different embodiments are normally given the same reference signs.

A gearbox 1 is placed on an output shaft 2 of an electric motor/generator 12. Furthermore, a wheel 3 is placed on said output shaft 2 for connection by means of bands or chains to a wheel on an input shaft of an AC 14. The gearbox 1 comprises a planetary gear set and a gear wheel 4 for connection to the engine 13. The gearbox 1 further comprises an actuator acting on a shift fork 5, which actuator is used for placing the gearbox 1 in different modes. The shift fork 5 moves a selection gear wheel 6 to select the appropriate mode.

The planetary gear set comprises a sun gear 7, planet gears 8 supported by a carrier 9 and an annular gear 10. The carrier 9 of the planetary gear set is mechanically fixed to gear wheel 4 for connection to the engine 13. In one embodiment said mechanical fixation is accomplished in that carrier 9 is made in one piece with the gear wheel 4.

The output shaft 2 of the electric motor 12 is drivingly connected to a further shaft 11, in line with the output shaft 2. In the shown embodiment the further shaft 11 is made in one piece with the wheel 3 for connecting the output shaft 2 of the electric motor 12 with the AC 14. The selection gear wheel 6 actuated by the shift fork 5 of the actuator is drivingly connected to the further shaft 11 and is displaceable along said further shaft 11. The selection gear wheel 6 is connected by means of splines to the further shaft 11.

Figure 1A:
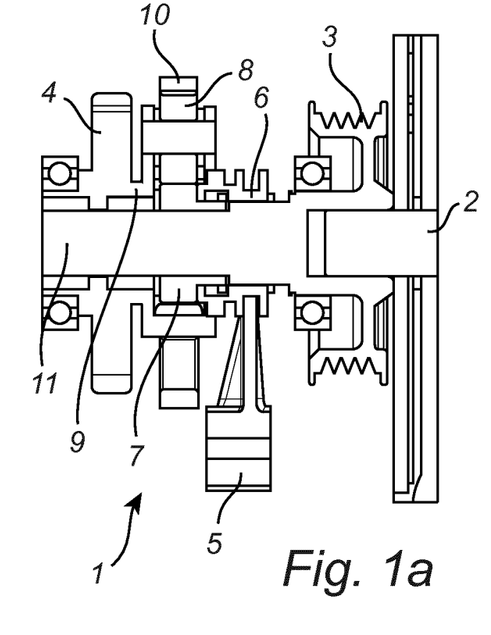
FIGS. 1a to 1c are cross sections of a gearbox according to the present invention in three different modes.

By means of the shift fork 5 of the actuator the selection gear wheel 6 is displaced into different position to give different gear ratios of the gearbox 1. In a first position for the selection gear wheel 6, placed to the left as shown in FIG. 1a, the output shaft 2 of the electric motor 12 is drivingly connected to the carrier 9 of the planetary gear set. As the gear wheel 4 for connection to the engine 13 is mechanically fixed to the carrier 9, said gear wheel 4 will be rotated with the rotational speed of the output shaft 2 of the electric motor 12. Thus, there will be a ratio of 1:1 between the electric motor 12 and the engine 13.

Figure 1B:
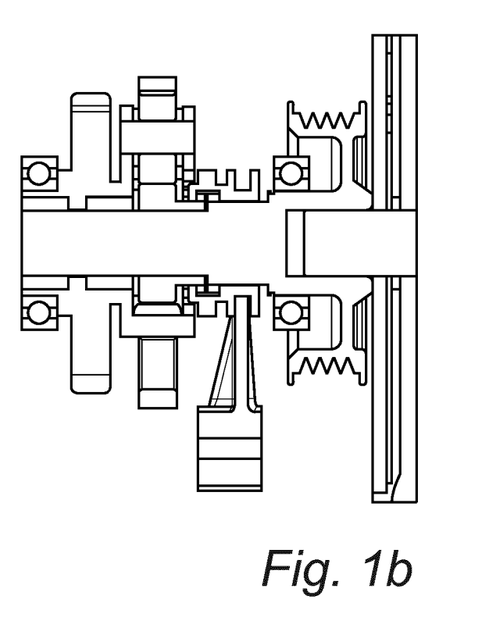

In a middle position for the selection gear wheel 6, as shown in FIG. 1b, the selection gear wheel 6 is moved out of contact with any other gear wheel, whereby there is no driving contact between the electric motor 12 and the engine 13. Thus, the gearbox 1 is in a neutral state in which the AC 14 still is driven by the electric motor. By having the AC 14 driven directly by the electric motor 12 the AC 14 may be running without running the engine 13.

Figure 1C:
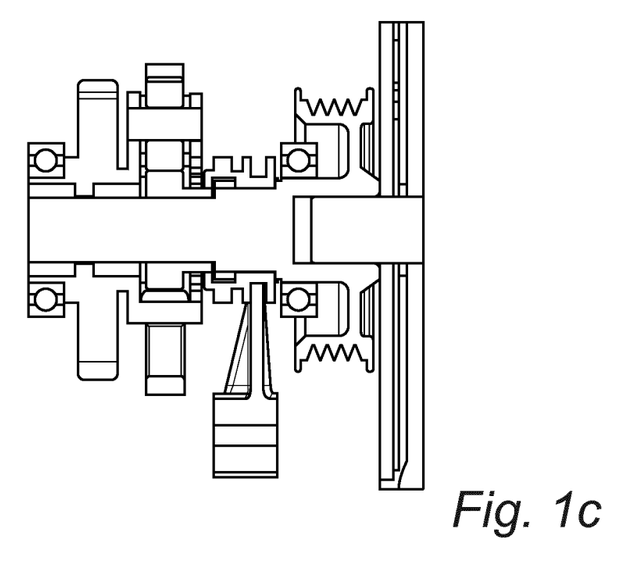

In a position to the right, as shown in FIG. 1c, the shift fork 5 has moved the selection gear wheel 6 into driving contact with the sun gear 7 of the planetary gear set. By means of the relationship between the different gear wheels of the planetary gear set the ratio between the electric motor and the engine will be x:1, whereby x depends on the planetary gear set.

Figure 2A:
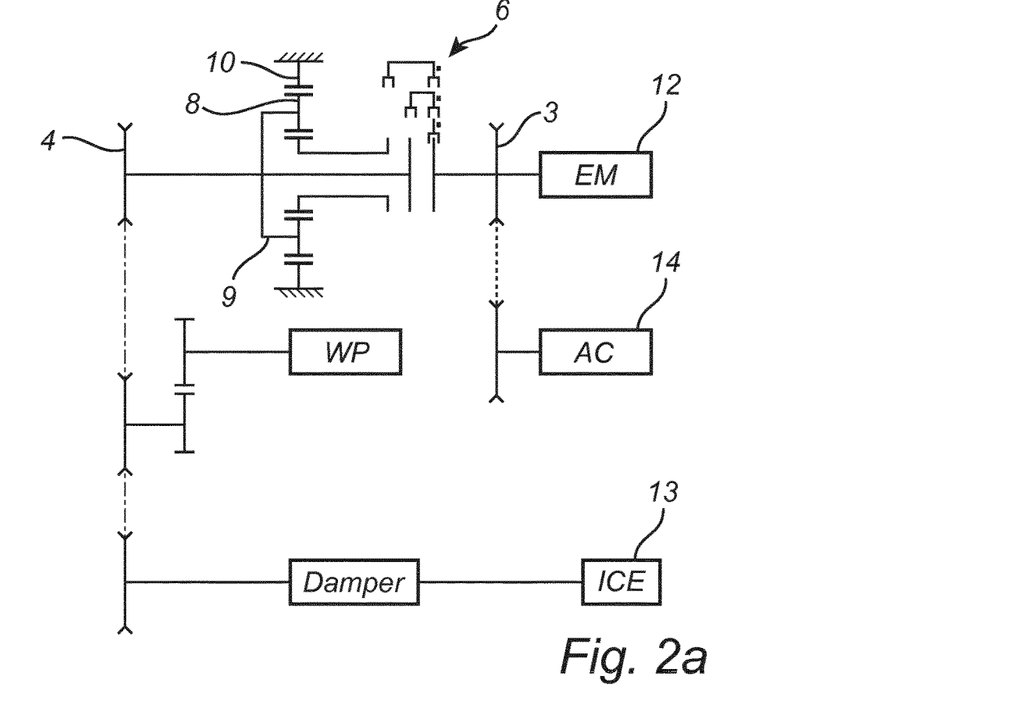
FIGS. 2a to 2c are schematic representations of the driveline including the gearbox of FIGS. 1a to 1c in different modes.
Figure 2B:
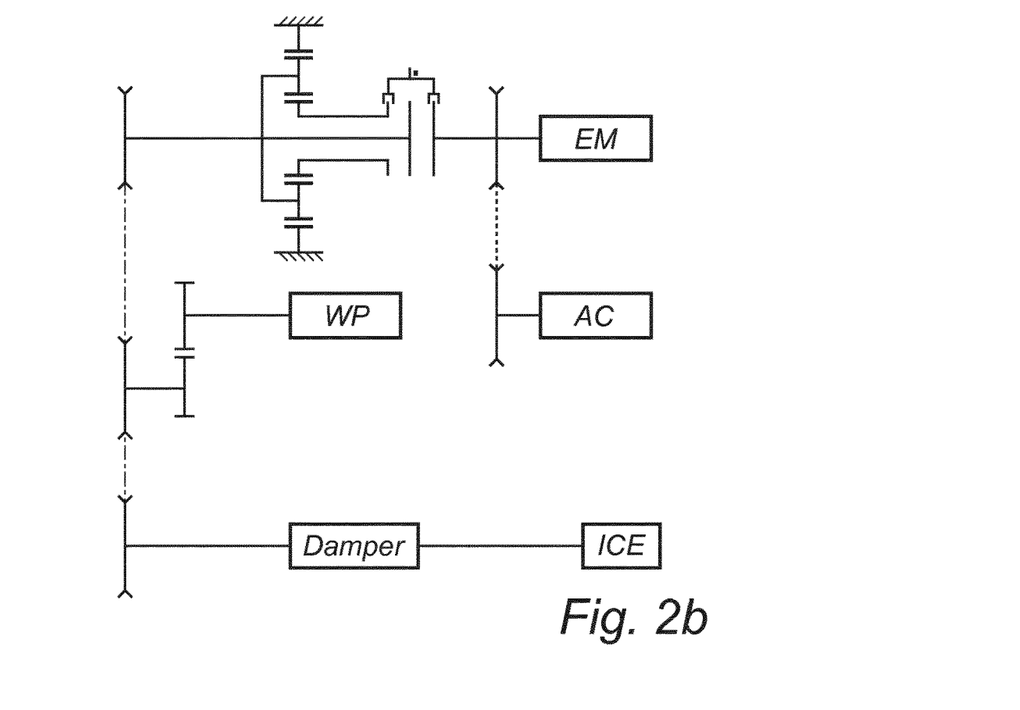
Figure 2C:
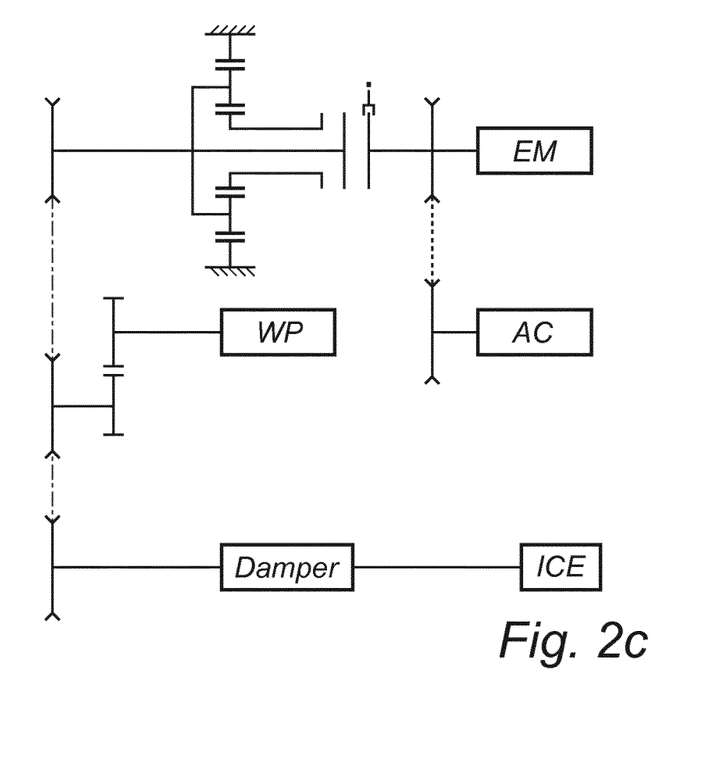

In FIG. 2a the three possible positions of the selection gear wheel 6 is indicated. In FIG. 2b the gearbox is shown in a mode corresponding with the one shown in FIG. 1c. In FIG. 2c the gearbox is shown in a mode corresponding with the one shown in FIG. 1b.

In a second embodiment of the gear box there is no planetary gear set. The output shaft 2 of the electric motor 12 is drivingly connected to a further shaft 11. The further shaft 11 is made in one piece with a wheel 3 for driving connection by means of bands or chains to an input shaft of the AC.

An intermediate gear wheel 15 and an outer gear wheel 16 are received on the further shaft 11, which intermediate and outer gear wheels 15, 16 are free to rotate in relation to the further shaft 11, depending on the position of an actuator. Two further gear wheels 17, 18 are placed on an intermediate shaft 19, which intermediate shaft 19 is placed in parallel with the further shaft 11. The gear wheels 17, 18 on the intermediate shaft 19 are rotationally fixed to the intermediate shaft 19, i.e. they rotate with the intermediate shaft 19. The gear wheels 17, 18 of the intermediate shaft 19 are respectively in mesh with the intermediate and outer gears 15, 16 of the further shaft 11.

Figure 3A:
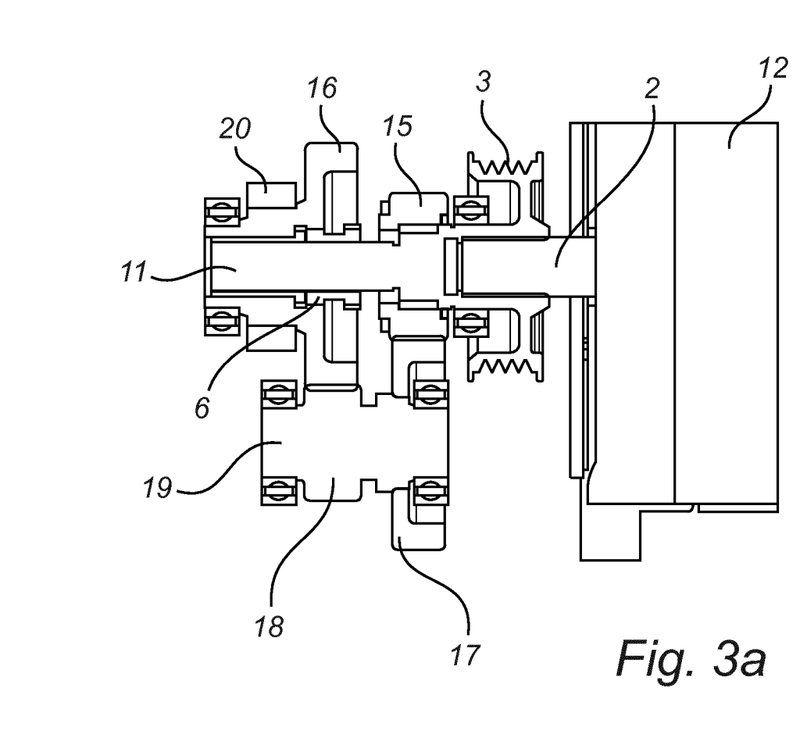
FIGS. 3a to 3c are cross sections of a another embodiment of the present invention in three different modes.

An actuator corresponding with the actuator described above is also used in this embodiment. The actuator comprises a shift fork acting on a selection gear wheel 6 that is arranged displaceable on and along the further shaft 11. In a position to the left, as seen in FIG. 3a, the selection gear wheel 6 drivingly connects the further shaft 11 to the outer gear wheel 16, which outer gear wheel 16 is drivingly connected to the engine 13. It will thereby be a ratio of 1:1 in the gearbox between the electric motor 12 and the engine 13.

Figure 3B:
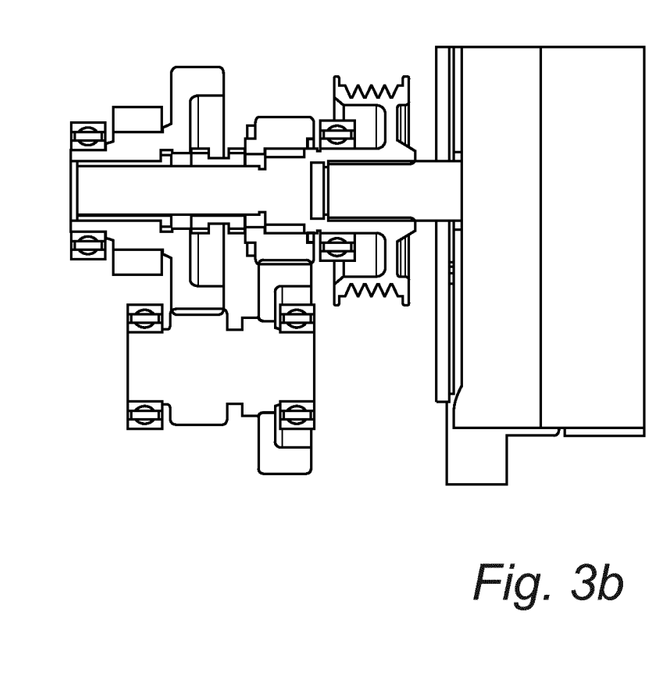

In a middle position for the selection gear wheel 6, as shown in FIG. 3b, the selection gear wheel 6 is moved out of contact with any other gear wheel, whereby there is no driving contact between the electric motor 12 and the engine 13. Thus, the gearbox is in a neutral mode.

Figure 3C:
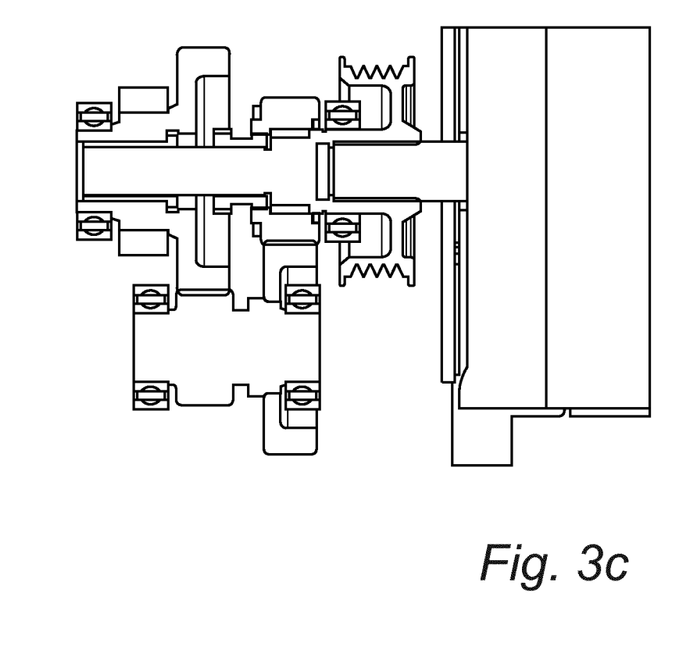

In a position to the right for the selection gear wheel 6, as shown in FIG. 3c, the intermediate gear 15 of the further shaft 11 is drivingly connected to one of the gear wheels 17 of the intermediate shaft 19. The other gear wheel 18 of the intermediate shaft 19 is thereby drivingly connected to the outer gear wheel 16 of the further shaft 11. The driving force between the electric motor 12 and the engine 13 will thereby go via the gear wheels 17, 18 of the intermediate shaft 19. The ratio of the gearbox will thereby depend on the relationship between the gear wheels 15, 16, 17, 18 of the further and intermediate shafts 11, 19.

Figure 4:
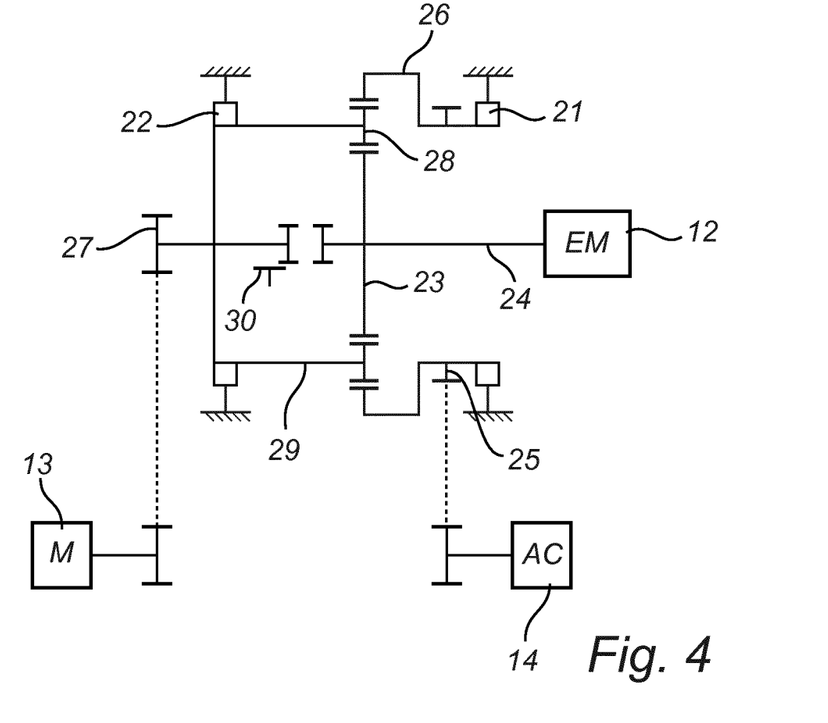
FIG. 4 is a schematic representation of the driveline including a further embodiment of the gearbox.
Figure 5A:
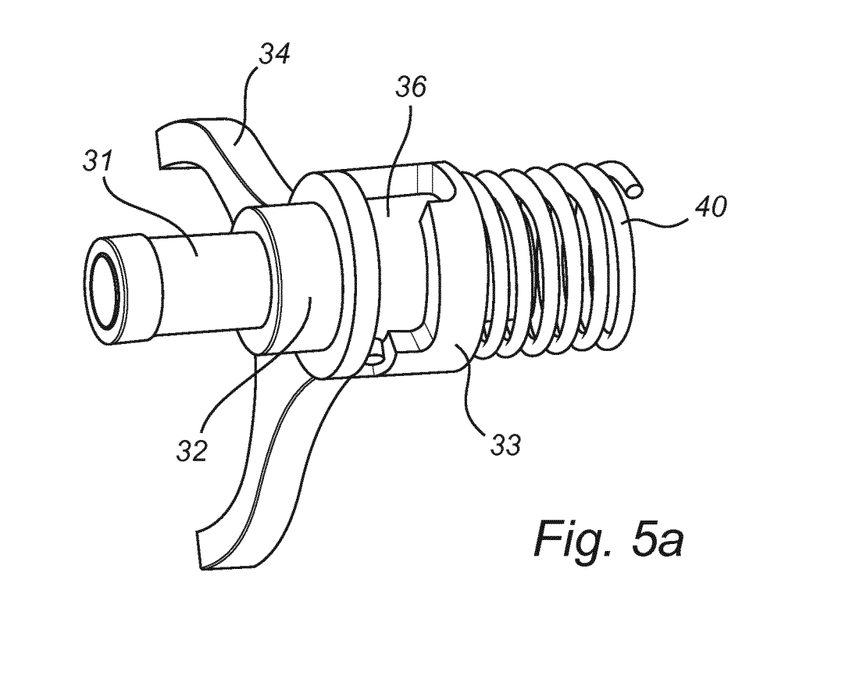
FIGS. 5a to 5f are side views of an actuator of the gearbox in different positions.
Figure 5B:
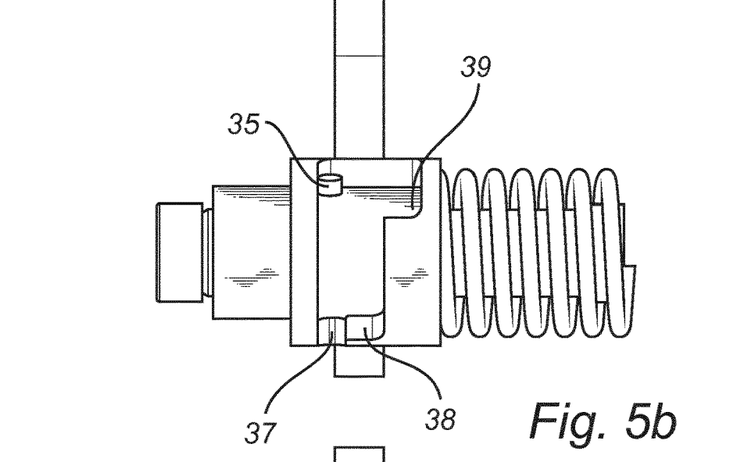
Figure 5C:
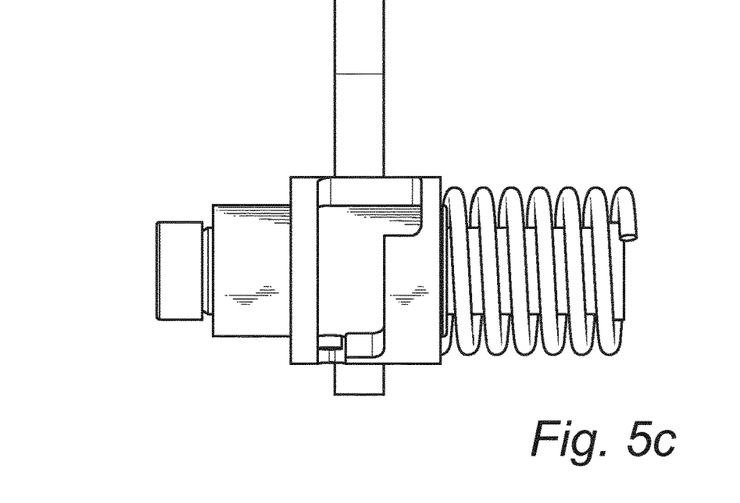
Figure 5D:
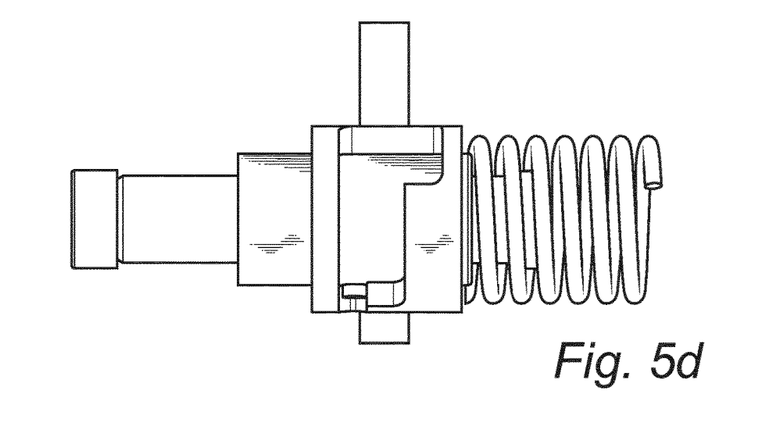
Figure 5E:
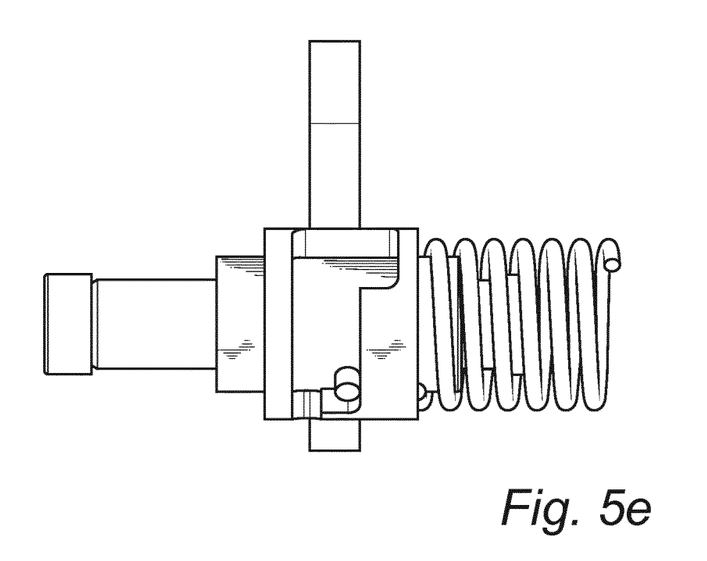
Figure 5F:
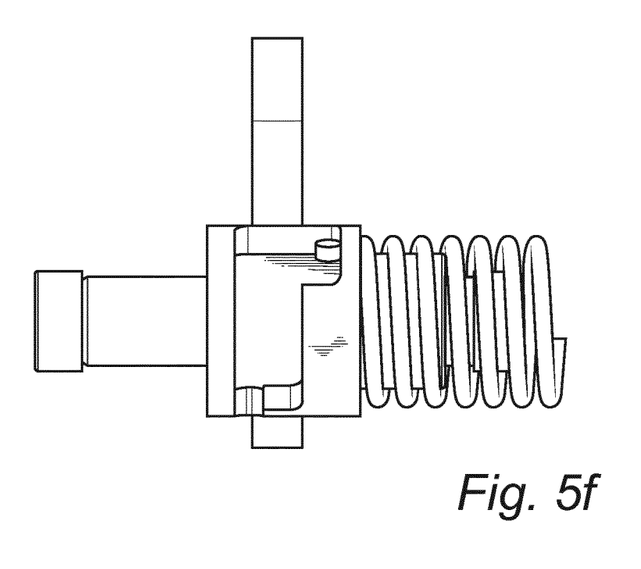

In one further embodiment as shown in FIG. 4, first and second free wheels 21, 22 are used together with a planetary gear set. A sun gear 23 of the planetary gear set is fixed to the output shaft 24 of the electric motor 12. Thus, the sun gear 23 will rotate with the output shaft 24 of the electric motor 12. A wheel 25 for driving connection by means of belts or chains with the AC 14 is fixed to the ring gear 26 of the planetary gear set. The first free wheel 21 is connected to the ring gear 26 and locks rotational movement in one direction. A wheel 27 for driving connection by means of bands or chains with the engine 13 is fastened to the carrier 29 of the planetary gear set. The second free wheel 22 is connected to the carrier 29, locking rotational movement in one direction. A dog clutch 30 is positioned to connect or disconnect the carrier 29 with the output shaft 24 of the electric motor 12. With open dog clutch 30 and with the output shaft 24 of the electric motor 12 rotating in a first direction the first free wheel 21 will lock the ring gear 26, whereby there will be a ratio between the electric motor 12 and the engine 13 which depends on the planetary gear set. In one embodiment said ratio is 3:1. The AC 14 will not be driven. If the output shaft 24 of the electric motor 12 is rotated in the opposite direction and with the dog clutch 30 still open, the second free wheel 22 will lock the carrier 29 and, thus, there will be no driving contact between the electric motor 12 and the engine 13. However, the AC 14 will be driven. After start the electric motor 12 is given the same rotational speed as the engine 13, in order to be able to close the dog clutch 30. With the dog clutch 30 closed the ratio between the engine 13 and the electric motor 12 will be 1:1. With the dog clutch 30 closed it is possible to transfer torque in both direction.

A person skilled in the art realizes that the mutual placement of the different gear wheels, the further shaft, the possible intermediate shaft and the actuator can vary without departing from the concept of the present invention. The actuator may be driven electrically, pneumatically or hydraulically.

One example of an actuating means is indicated in FIGS. 5a to 5f. It comprises a rod 31 driven in a rotational direction by a suitable actuator, such as an electric motor. The rod 31 has an outer thread and is received inside a hub 32 having an internal thread. The hub 32 is placed inside a hub part 33 of a shift fork 34. The shift fork 34 is to displace a selection gear wheel for connecting and disconnecting different gear wheels as indicated above for the different embodiments. A shift pin 35 projects from the hub 32. The hub part 33 of the shift fork 34 has an opening 36 with one side of the opening 36 having seats 37, 38, 39 for receiving the shift pin 35 of the hub 32 in different positions. The hub part 33 of the shift fork 34 is arranged moveable in an axial direction on the hub 32. A spring 40 is placed on the side of the hub part 33 of the shift fork 34 opposite the side on which the driving means of the actuator is placed. The spring 40 is placed to press the shift fork 34 in direction towards the side on which the driving means of the actuator is placed. The hub part 33 of the shift fork 34 has three seats 37, 38, 39, which seats are placed on the side of the opening 36 of the hub part 33 facing the spring 40. A first seat 37 of the hub part 33 is placed adjacent the side of the opening 36 of the hub part 33 facing away from the spring 40 placed on one side of the hub part 33. A second seat 38 is placed approximately in the middle between the sides of the opening 36 of the hub part 33 facing and facing away, respectively, from the spring 40. A third seat 39 is placed adjacent the side of the opening 36 of the hub part 33 facing the spring 40. The three seats 37, 38, 38 are placed at different rotational positions of the opening 36, with the second seat 38 placed in a rotational position between the first and third seats 37, 39.

In use the rod 31 is rotated in a first rotational direction until the shift pin 35 is placed in the first seat 37 of the opening 36 of the hub part 33 of the shift fork 34. By further rotation of the rod 31 in the same direction the rod 31 will be moved in relation to the hub 32 by means of the cooperating threads of respective part. The shift fork 34 will thereby be pressed in direction towards the spring 40. If the rod 31 then is rotated in a second rotational direction opposite the first rotational direction, the shift pin 35 will be moved to the second seat 38, whereby the shift fork 34 is moved in direction towards the driving means of the actuator by means of the spring 40. By rotating the rod 31 further in the second rotational direction the shift pin 35 will be moved to the third seat 39, whereby the shift fork 34 is moved in direction towards the driving means of the actuator by means of the spring 40.

A person skilled in the art realises that the dog clutch is only one example of an embodiment for the shifting device, controllable free wheels or friction clutches are used in other embodiments.

Figures 6, 7:
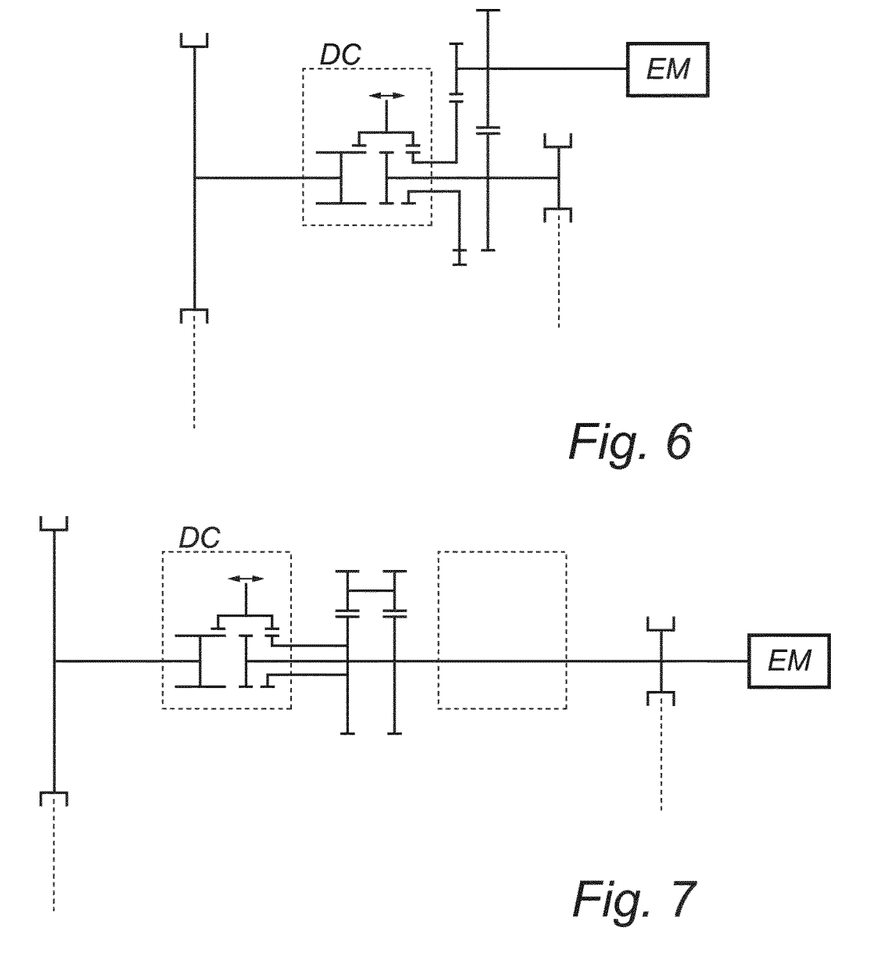
FIGS. 6 to 8 are further schematic embodiments of different gearboxes according to the present invention.
Figure 8:
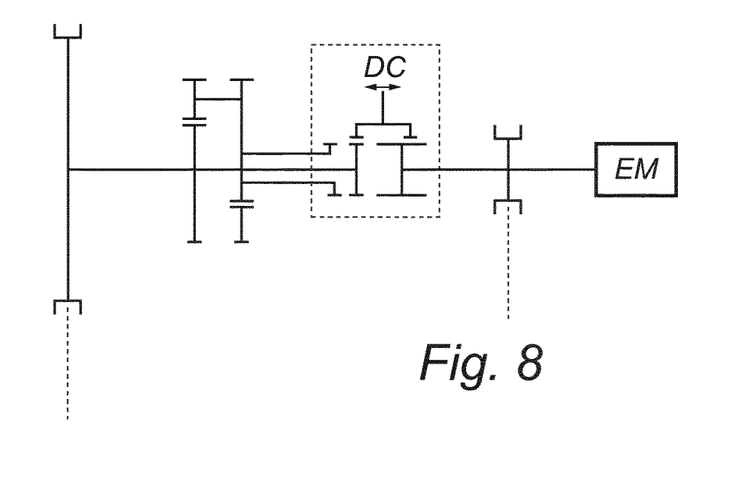

In the embodiments indicated in FIGS. 6 to 8 different modifications of the previously described embodiments are indicated. The embodiment of FIG. 6 differs from the embodiment of FIGS. 3a to 3c in that the electric motor is placed on the other shaft. In the embodiment of FIG. 7 it is indicated that the dog clutch (DC) may alternately be placed on either side of the gearbox. The embodiment of FIG. 8 corresponds with the embodiment of FIG. 6, except that the dog clutch is given another position.

The invention claimed is:

1. A product comprising:
a gearbox placed in a drive train between an electric motor and an engine of a vehicle,
wherein the gearbox is placed in direct connection to an output shaft of the electric motor and that it comprises means to place it in three different modes,
wherein the gearbox comprises a planetary gear set, comprising a sun gear, planet gears, a carrier and an annular gear, and a selection gear wheel, arranged displaceable on a further shaft drivingly connected to the output shaft of the electric motor, and wherein the selection gear wheel is displaced by means of a shift fork.

2. The product of claim 1, wherein an AC is constantly connected to the output shaft of the electric motor.

3. The product of claim 2, wherein a wheel is drivingly connected to the output shaft of the electric motor, which wheel receives means to connect it with a wheel of the AC, which connecting means is one or more bands or chains.

4. The product of claim 1, wherein the sun gear is received on the further shaft in such a way that the sun gear and the further shaft are free to rotate in relation to each other and wherein the carrier is mechanically fixed to a gear wheel drivingly connected to the engine.

5. The product of claim 4, wherein the selection gear wheel is arranged moveable between three positions by means of an actuator acting on the shift fork, wherein in a first position the selection gear wheel is connected to the carrier, wherein in a second position the selection gear wheel is not connected to any other part, and wherein in a third position the selection gear wheel is connected to the sun gear.

6. The product of claim 1, wherein the output shaft of the electric motor is drivingly connected to a further shaft of the gearbox placed in line with the output shaft of the electric motor,
wherein the gearbox comprises an intermediate gear wheel and an outer gear wheel placed on the further shaft in such a way that the intermediate and outer gear wheels are free to rotate in relation to the further shaft,
wherein the intermediate gear wheel is placed closer to the electric motor than the outer gear wheel, wherein the gearbox further comprises two further gear wheels received mechanically fixed on an intermediate shaft being parallel with the further shaft,
wherein one of the two further gear wheels are in constant mesh with the intermediate gear wheel and the other of the two further gear wheels are in constant mesh with the outer gear wheel and wherein the outer gear wheel is mechanically connected to a gear wheel drivingly connected to the engine.

7. The product of claim 6, wherein a selection gear wheel drivingly received on the further shaft is arranged moveable between three positions by means of an actuator,
wherein in a first position the selection gear wheel is connected to the outer gear wheel,
wherein in a second position the selection gear wheel is not connected to any other part, and wherein in a third position the selection gear wheel is connected to the intermediate gear wheel.

8. A product comprising an actuator to be used for controlling the position of a selection gear wheel wherein the actuator comprises a rod, having an outer thread,
a hub, having an internal thread,
a shift fork, having a hub part, inside of which hub part the hub is received, and a spring placed at one end of the rod abutting one end of the hub part of the shift fork urging the shift fork towards the other end of the rod,
wherein the hub has a shift pin projecting into an opening of the hub part of the shift fork,
wherein the opening has three seats placed in mutually different axial and rotational positions, and wherein the shift pin counteracts the force of the spring when the shift pin is placed in one of the three seats.

9. The product of claim 8, wherein the rod is connected to the hub by means of the outer thread of the rod cooperating with the internal thread of the hub.

* * * * *